US011017084B2

(12) United States Patent
Hay et al.

(10) Patent No.: US 11,017,084 B2
(45) Date of Patent: May 25, 2021

(54) DETECTION OF MALICIOUS CODE FRAGMENTS VIA DATA-FLOW ISOLATION

(71) Applicant: INTERNATIONAL BUSINESS MACHINES CORPORATION, Armonk, NY (US)

(72) Inventors: Roee Hay, Haifa (IL); Marco Pistoia, Amawalk, NY (US); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 15/818,938

(22) Filed: Nov. 21, 2017

(65) Prior Publication Data
US 2019/0156028 A1   May 23, 2019

(51) Int. Cl.
*G06F 11/00* (2006.01)
*G06F 12/14* (2006.01)
*G06F 12/16* (2006.01)
*G08B 23/00* (2006.01)
*G06F 21/56* (2013.01)

(52) U.S. Cl.
CPC ...... *G06F 21/563* (2013.01); *G06F 2221/033* (2013.01)

(58) Field of Classification Search
CPC .. G06F 21/563; G06F 2221/033; G06F 21/50; G06F 21/55; G06F 21/552; G06F 21/554; G06F 21/56; G06F 21/577; G06F 2221/03; G06F 2221/034; H04W 12/12; H04W 12/1208
See application file for complete search history.

(56) References Cited

U.S. PATENT DOCUMENTS

| 8,806,643 B2 | 8/2014 | Nachenberg |
| 9,530,016 B1 | 12/2016 | Pomerantz |
| 2013/0042294 A1 | 2/2013 | Colvin et al. |

(Continued)

OTHER PUBLICATIONS

Arp et al., "DREBIN: Effective and Explainable Detection of Android Malware in Your Pocket," Conference: Network and Distributed System Security Symposium (NDSS), Conference Paper: Feb. 2014, DOI: 10.14722/ndss.2014.23247, pp. 1-15.

(Continued)

*Primary Examiner* — Amie C. Lin
(74) *Attorney, Agent, or Firm* — Steven M. Boukniqht (57) ABSTRACT

A method for detecting malicious code fragments based on data-flow isolation is provided. The method may include isolating data flows associated with a computing program for a user device. The method may further include mapping steps for the isolated data flow to modules associated with the computing program and the user device. The method may further include comparing the mapped steps to determine connections between the isolated data flows. The method may further include, based on the comparison of the mapped steps and the modules, determining whether the isolated data flows comprise malicious data flow deviations. The method may also include, in response to the determination that the isolated data flows comprise malicious data flow deviations, determining whether the computer program is malicious by weighing security risks associated with the malicious data flow deviations based on security risk factors.

17 Claims, 6 Drawing Sheets

(56) References Cited

U.S. PATENT DOCUMENTS

| | | | | |
|---|---|---|---|---|
| 2016/0127367 A1* | 5/2016 | Jevans | ................ | G06F 21/554 |
| | | | | 713/152 |
| 2016/0149937 A1* | 5/2016 | Katmor | .............. | H04L 63/0263 |
| | | | | 726/23 |
| 2018/0203998 A1* | 7/2018 | Maisel | ................ | G06F 21/565 |
| 2019/0108338 A1* | 4/2019 | Saxe | .................... | G06F 21/562 |

OTHER PUBLICATIONS

Cockerill, "Lookout Blog: Hundreds of millions of devices potentially affected by first major iOS malware outbreak," Sep. 20, 2015, https://blog.lookout.com/blog/2015/09/20/xcodeghost/, Printed on Jun. 15, 2017, pp. 1-6.

Pandita et al., "WHYPER: Towards Automating Risk Assessment of Mobile Applications," Proceedings of the 22nd USENIX Security Symposium, Aug. 14-16, 2013, Washington, D.C., USA, USENIX Association, pp. 527-542.

Qu et al., "AutoCog: Measuring the Description-to-permission Fidelity in Android Applications," ACM Conference on Computer and Communications, 2014 (Best Date Available), DOI: 10.1145/2660267.2660287, pp. 1-13.

Tripp et al., "TAJ: Effective Taint Analysis of Web Applications," PLDI '09, Jun. 15-20, 2009, Dublin, Ireland, Copyright 2009, ACM 978-1-60558-392—Jan. 9, 2006, pp. 87-97.

Mell et al., "The NIST Definition of Cloud Computing, National Institute of Standards and Technology," U.S. Department of Commerce, Special Publication 800-145, Sep. 2011, pp. 1-7.

\* cited by examiner

DETECTION OF MALICIOUS CODE FRAGMENTS VIA DATA-FLOW ISOLATION

BACKGROUND

The present invention relates generally to the field of computing, and more specifically, to data security and management.

Generally, malware is among the main threat types in the computing and mobile device industry. An attack from malicious software has a number of malicious purposes that may include stealing data, damaging a computing or mobile device, and blackmailing or annoying the user. A malware attacker may typically defraud the user by coercing the user to install unwanted and malicious applications on a user's computing or mobile device that may allow the attacker to access a user's device remotely and without the user's authorization, and exploit security vulnerabilities in the mobile device. The malware family may include such as viruses as Trojans, worms, botnets.

SUMMARY

A method for detecting malicious code fragments based on data-flow isolation is provided. The method may include isolating a plurality of data flows associated with a computing program for a user device. The method may further include mapping one or more steps for the plurality of isolated data flows to one or more modules associated with the computing program and the user device. The method may further include comparing the one or more mapped steps associated with the plurality of isolated data flows to determine connections and commonalities between the plurality of isolated data flows. The method may further include, based on the comparison of the one or more mapped steps associated with the plurality of isolated data flows and based on the one or more modules associated with the computing program and the user device, determining whether one or more of the isolated data flows associated with the plurality of isolated data flows comprise malicious data flow deviations. The method may also include, in response to the determination that one or more of the isolated data flows comprise malicious data flow deviations, determining whether the computer program is malicious by weighing security risks associated with the malicious data flow deviations based on a plurality of security risk factors.

A computer system for detecting malicious code fragments based on data-flow isolation is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include isolating a plurality of data flows associated with a computing program for a user device. The method may further include mapping one or more steps for the plurality of isolated data flows to one or more modules associated with the computing program and the user device. The method may further include comparing the one or more mapped steps associated with the plurality of isolated data flows to determine connections and commonalities between the plurality of isolated data flows. The method may further include, based on the comparison of the one or more mapped steps associated with the plurality of isolated data flows and based on the one or more modules associated with the computing program and the user device, determining whether one or more of the isolated data flows associated with the plurality of isolated data flows comprise malicious data flow deviations. The method may also include, in response to the determination that one or more of the isolated data flows comprise malicious data flow deviations, determining whether the computer program is malicious by weighing security risks associated with the malicious data flow deviations based on a plurality of security risk factors.

A computer program product for detecting malicious code fragments based on data-flow isolation is provided. The computer program product may include one or more computer-readable storage devices and program instructions stored on at least one of the one or more tangible storage devices, the program instructions executable by a processor. The computer program product may include program instructions to isolate a plurality of data flows associated with a computing program for a user device. The computer program product may also include program instructions to map one or more steps for the plurality of isolated data flows to one or more modules associated with the computing program and the user device. The computer program product may further include program instructions to compare the one or more mapped steps associated with the plurality of isolated data flows to determine connections and commonalities between the plurality of isolated data flows. The computer program product may also include, based on the comparison of the one or more mapped steps associated with the plurality of isolated data flows and based on the one or more modules associated with the computing program and the user device, program instructions to determine whether one or more of the isolated data flows associated with the plurality of isolated data flows comprise malicious data flow deviations. The computer program product may further include, in response to the determination that one or more of the isolated data flows comprise malicious data flow deviations, program instructions to determine whether the computer program is malicious by weighing security risks associated with the malicious data flow deviations based on a plurality of security risk factors.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to data security and management. The following described exemplary embodiments provide a system, method and program product for detecting malicious code fragments based on data-flow isolation. Specifically, the present embodiment has the capacity to improve the technical field associated malware detection by isolating and mapping the flows of information in an application, and determining, based on the application's configuration and flows of information, whether the isolated and mapped flows are malicious and whether the isolated and mapped flows form a link with the application such that the entirety of the application is malicious.

As previously described with respect to data security and management, an attack from malicious software has a number of malicious purposes that may include stealing data, damaging a computing or mobile device, and blackmailing or annoying the user. Based on advancements in malicious software, static malware detection has become an active area of research, where the ultimate goal is to design malware detection techniques that are scalable and robust for different computing devices. Scalability may include designing malware detection software that continues to function well when the software or its context is changed in size or volume in order to meet industry-scale applications, while robustness may include designing malware detection software that is difficult to bypass and may require a malware attacker to invest significant time in evading detection. To meet requirements for scalability, several solutions have utilized lexical features that may include detecting malware using syntactic structures for exception handling or using an application's configuration such that the application (when or before downloading) asks permissions for use other applications based on the application's manifest file. Unfortunately, while lexical features may offer simplicity and good performance, they are not robust.

A malware attacker can typically piggyback off an application's configuration and permissions to often add additional behaviors to the application. For example, a malware attacker may piggyback off an application that accesses and turns on a mobile device's light—i.e. for use as a flashlight—by adding malicious code to the application's configuration, which in turn causes the application to also ask for permissions to access the device's ID and possibly other sensitive and/or benign features, which a user may blindly approve. Therefore, illegal flows of information inside a malicious application may be contained within sets of isolated modules associated with the application. As such, it may be advantageous, among other things, to provide a system, method and program product for detecting malicious code fragments based on data-flow isolation. Specifically, the system, method, and program product may detect malicious code fragments by isolating and mapping the flows of information in an application, and determining, based on the application's configuration and flows of information, whether the isolated and mapped flows are malicious and whether the isolated and mapped flows form a link with the application such that the entirety of the application is malicious.

According to at least one implementation of the present embodiment, one or more data flows associated with a computing program for a user device may be isolated. Next, each step associated with each of the one or more isolated data flows may be mapped to one or more modules associated with the computing program and the user device. Then, each of the mapped steps associated with each of the isolated data flows may be compared to determine commonalities between each of the isolated data flows. Next, based on the comparison of each of the mapped steps associated with each of the isolated data flows and based on the one or more modules associated with the computing program and the user device, whether one or more of the isolated data flows comprise malicious data flow deviations may be determined. Then, in response to determining that one or more of the isolated data flows comprise malicious data flow deviations, whether the computer program is malicious may be determined by weighing security risks associated with the malicious data flow deviations based on security risk factors. Next, the computer program may be reported to the user as malicious in response to the determination that the computer program is malicious. Alternatively, the malicious data flow deviations may be reported as malicious in response to the determination that the computer program is not malicious.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for detecting malicious code fragments based on data-flow isolation.

As previously described, and according to at least one implementation, one or more data flows associated with a computing program for a user device may be isolated. Next, each step associated with each of the one or more isolated data flows may be mapped to one or more modules associated with the computing program and the user device. Then, each of the mapped steps associated with each of the isolated data flows may be compared to determine commonalities between each of the isolated data flows. Next, based on the comparison of each of the mapped steps associated with each of the isolated data flows and based on the one or more modules associated with the computing program and the user device, whether one or more of the isolated data flows comprise malicious data flow deviations may be determined. Then, in response to determining that one or more of the isolated data flows comprise malicious data flow deviations, whether the computer program is malicious may be determined by weighing security risks associated with the malicious data flow deviations based on security risk factors. Next, the computer program may be reported to the user as malicious in response to the determination that the computer program is malicious. Alternatively, the malicious data flow deviations may be reported as malicious in response to the determination that the computer program is not malicious.

Figure 1:
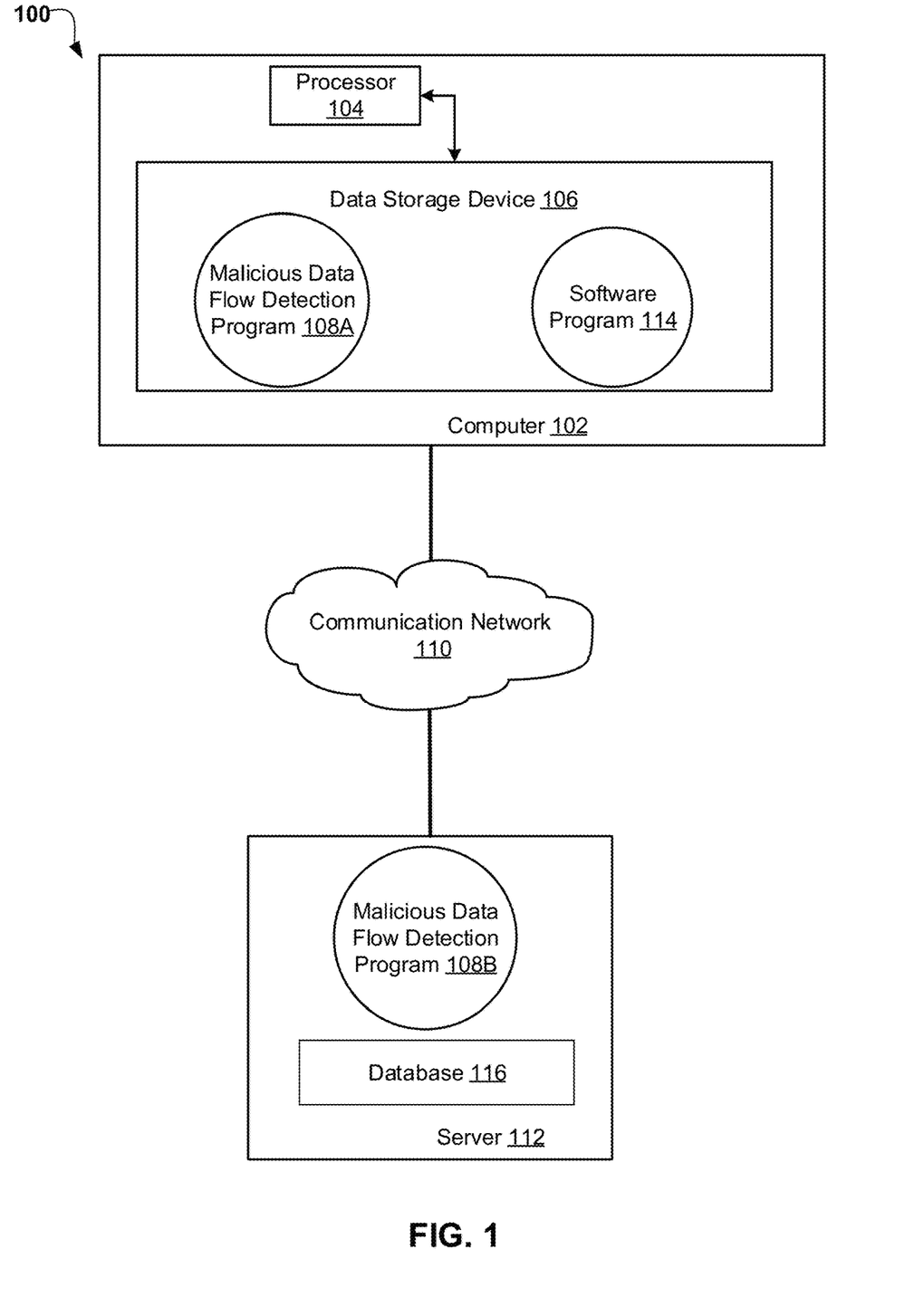
FIG. 1 illustrates a networked computer environment according to one embodiment.

Referring now to FIG. 1, an exemplary networked computer environment 100 in accordance with one embodiment is depicted. The networked computer environment 100 may include a computer 102 with a processor 104 and a data storage device 106 that is enabled to run a malicious data flow detection program 108A and a software program 114, and may also include a microphone (not shown). The software program 114 may be an application program such as an app on a computing device. The malicious data flow detection program 108A may communicate with the software program 114. The networked computer environment 100 may also include a server 112 that is enabled to run a malicious data flow detection program 108B and the communication network 110. The networked computer environment 100 may include a plurality of computers 102 and servers 112, only one of which is shown for illustrative brevity.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively, and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the malicious data flow detection program 108A, 108B may interact with a database 116 that may be embedded in various storage devices, such as, but not limited to, a mobile device 102, a networked server 112, or a cloud storage service.

According to the present embodiment, a program, such as a malicious data flow detection program 108A and 108B may run on the client computer 102 or on the server computer 112 via a communications network 110. The malicious data flow detection program 108A, 108B may detect malicious code fragments based on data-flow isolation. Specifically, a user using a computer, such as computer 102, may run a malicious data flow detection program 108A, 108B, that may interact with the client computer 102 and the software program 114, to detect malicious code fragments by isolating and mapping the flows of information in an application, and determining, based on the application's configuration and flows of information, whether the isolated and mapped flows are malicious and whether the isolated and mapped flows form a link with the application such that the entirety of the application is malicious.

Figure 2:
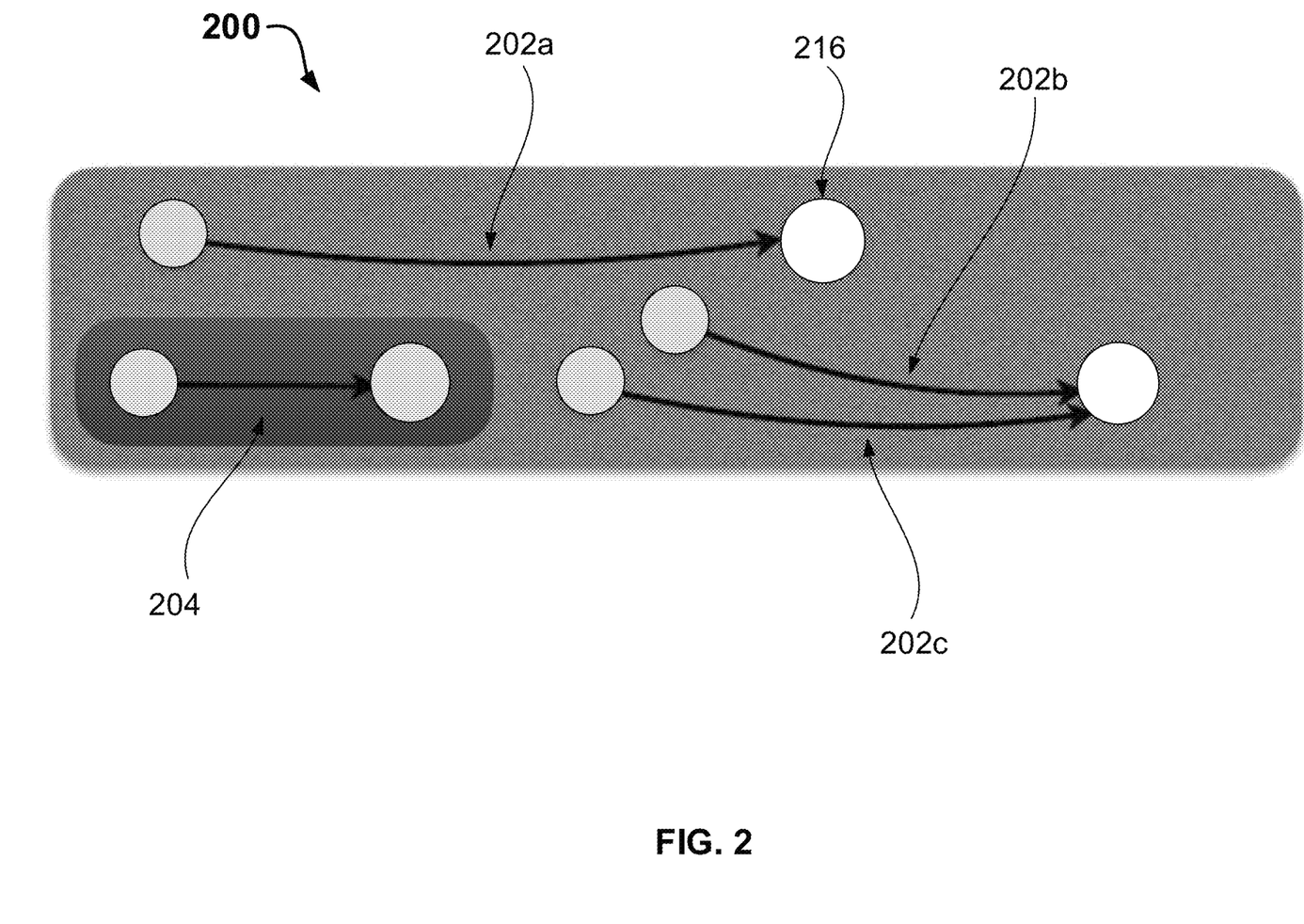
FIG. 2 is a block diagram illustrating isolated data flows associated with a program for malicious data flow detection according to one embodiment.

Referring now to FIG. 2, a block diagram 200 illustrating isolated data flows according to one implementation of the malicious data flow detection program 108A, 108B is depicted. Specifically, according to one embodiment, the malicious data flow detection program 108A, 108B (FIG. 1) may receive and interact with a computing program, such as an app on a mobile device. Thereafter, based on the interaction, the malicious data flow detection program 108A, 108B (FIG. 1) may extract program code from the computing program to identify and isolate data flows that depict a flow of information between modules 216 (depicted by each of the circles in FIG. 2). For example, information may flow from one or more first modules 216 to one or more second modules 216 based on the program code. Furthermore, each of the one or more first modules 216 and the one or more second modules 216 may, for example, be a storage unit on the data storage device 106 (FIG. 1) that may store information such as information associated with the user device (such as device ID number, device location, device model, device storage information, device security information, device settings, device features, etc.) and information associated with applications on the device (such as application storage information, application security information, application settings, application features, etc.). Additionally, each of the one or more first modules 216 and the one or more second modules 216 may, for example, be a processing unit on one or more processors on the user's device and/or associated with one or more applications on the user's device, that is used to receive and process the aforementioned information associated with the user's device and the one or more application on the user's device.

For example, the malicious data flow detection program 108A, 108B (FIG. 1) may interact with a computing program such as an electronic consumer app that allows a user to purchase items on the app using the user's payment information. The malicious data flow detection program 108A, 108B (FIG. 1) may extract and isolate data flows from the electronic consumer app to identify the flows of information associated with the electronic consumer app. Specifically, for example, based on a user purchasing an item on the electronic consumer app, the malicious data flow detection program 108A, 108B (FIG. 1) may determine that one isolated data flow 202a may include reading credit card information from a module 216 associated with the electronic consumer app that is used for reading user credit card information on the app and/or from a module 216 associated with retrieving credit card information from a different app on the user's device that is accessed by the electronic consumer app, storing the credit card information on a variable using a module 216 associated with the electronic consumer app that is associated with storing the credit card information, reading the credit card information from the variable using a module 216 on the electronic consumer app that is associated with for reading the credit card information, and sending the credit card information via a module 216 on the electronic consumer app that is associated with sending the credit card information to the customer service department of an affiliated store based on the purchased item and connected with the electronic consumer app.

Furthermore, the malicious data flow detection program 108A, 108B (FIG. 1) may determine that one data flow 202b may include receiving the user's email information from a module 216 associated with the electronic consumer app that is used for reading and storing the user's email information, and sending the user's email information via a module 216 on the electronic consumer app that is used for sending the user's email information to a customer records department of the affiliated store associated with the purchased item and connected to the electronic consumer app. Additionally, the malicious data flow detection program 108A, 108B (FIG. 1) may determine that one data flow 202c may include receiving the user's home address and contact information from a module 216 associated with the electronic consumer app that is used for reading and storing the user's home address and contact information, and sending the user's home address and contact information via a module 216 on the electronic consumer app that is used for sending the user's home address and contact information to a customer records department of the affiliated store associated with the purchased item and connected with the electronic consumer app. However, the malicious data flow detection program 108A, 108B (FIG. 1) may determine that data flow 204 may include reading credit card information from a different module 216 associated with reading the user's credit card information from the user input and sending the user's credit card information to an unaffiliated and untrusted third-party, for example, via a short messaging service (SMS) or an email application.

Figure 3:
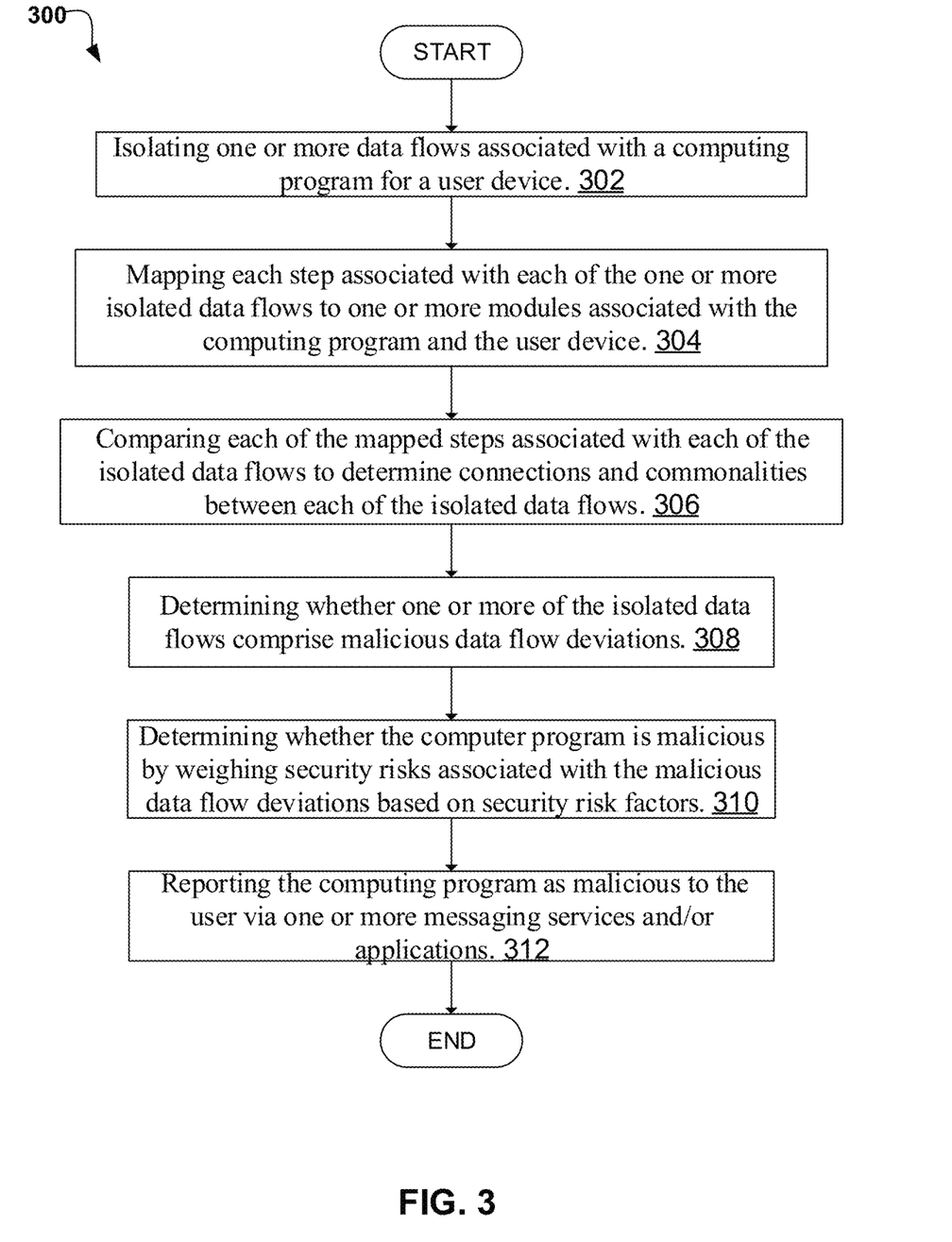
FIG. 3 is an operational flowchart illustrating the steps carried out by a program for detecting malicious code fragments based on data-flow isolation according to one embodiment.

Referring now to FIG. 3, an operational flowchart 300 illustrating the steps carried out by a program for detecting malicious code fragments based on data-flow isolation is depicted. At 302, the malicious data flow detection program 108A, 108B (FIG. 1) may isolate one or more data flows associated with a computing program for a user device. Specifically, and previously described in FIG. 2, the malicious data flow detection program 108A, 108B (FIG. 1) may receive and interact with the computing program, such as an app on a mobile device. Thereafter, based on the interaction, the malicious data flow detection program 108A, 108B (FIG. 1) may extract program code from the computing program to identify and isolate data flows that depict the flow of information associated with the computing program. More specifically, the malicious data flow detection program 108A, 108B (FIG. 1) may divide the extracted program code into code fragments, which include small sets of the extracted program code, and may depict different flows of information associated with different uses of the computing program, whereby the flows of information may start with a piece information extracted from a specific source and that is then communicated through different communication channels associated with the computing program and/or one or more applications associated with the user's device.

Next, at 304, the malicious data flow detection program 108A, 108B (FIG. 1) may map each step associated with each of the one or more isolated data flows to one or more modules associated with the computing program and the user device. Specifically, for example, and as previously described with respect to FIG. 2, the malicious data flow detection program 108A, 108B (FIG. 1) may interact with a computing program such as an electronic consumer app that allows a user to purchase items on the electronic consumer app using the user's payment information. Then, the malicious data flow detection program 108A, 108B (FIG. 1) may extract and isolate the data flows from the electronic consumer app to identify the flows of information associated with the electronic consumer app. Thereafter, the malicious data flow detection program 108A, 108B (FIG. 1) may map each of the extracted and isolated data flows associated with the electronic consumer app to one or more modules 216 associated with the computing program and the user device. For example, and as previously describe with respect to FIG. 2, based on a user purchasing an item on the electronic consumer app, the malicious data flow detection program 108A, 108B (FIG. 1) may determine that data flow 202a may map reading credit card information to a module 216 associated with reading user credit card information on the app and/or a module 216 associated with retrieving credit card information from a different app on the user's device that is accessed by the electronic consumer app, may map storing the credit card information on a variable to a module 216 associated with storing the credit card information, may map reading the credit card information from the variable to a module 216 associated with reading the credit card information, and may map sending the credit card information to a module 216 associated with sending the credit card information to the customer service department of the affiliated store based on the purchased item and the electronic consumer app.

Then, at 306, the malicious data flow detection program 108A, 108B (FIG. 1) may compare each of the mapped steps associated with each of the isolated data flows to determine connections and commonalities between each of the isolated data flows. Specifically, according to one embodiment, the malicious data flow detection program 108A, 108B (FIG. 1) may compare each of the mapped steps by comparing each flow of information and the modules 216 associated with each of the flows of information for each of the isolated data flows. As such, based on the comparison between the mapped steps associated with each of the isolated data flows, the malicious data flow detection program 108A, 108B (FIG. 1) may determine connections and commonalities between each of the isolated data flows. For example, based the isolated data flows as previously described in FIG. 2, the malicious data flow detection program 108A, 108B (FIG. 1) may compare the mapped steps of each of the isolated data flows to determine that the isolated data flows 202a, 202b, and 202c share similar communications channels and modules whereby information received on the electronic consumer app are transferred though communication channels and modules that are affiliated with or on the electronic consumer app, and that the transferred information is sent via the electronic consumer app to trusted affiliates associated with an purchased item on the app. Also, based on the isolated data flows as previously described in FIG. 2, the malicious data flow detection program 108A, 108B (FIG. 1) may determine that the isolated data flow 204 is different in that the isolated data flow 204 extracts and reads user information, such as user credit card information, using modules that may have nothing to do with the electronic consumer app, and may use applications, such as an SMS or email application that may have nothing to do with the electronic consumer app, to send the read user information to an untrusted and unaffiliated third-party.

Next, at 308, based on the comparison of each of the mapped steps associated with each of the isolated data flows and based on the one or more modules associated with the computing program and the user device, the malicious data flow detection program 108A, 108B (FIG. 1) may determine whether one or more of the isolated data flows comprise malicious data flow deviations. Specifically, the malicious data flow detection program 108A, 108B (FIG. 1) may determine whether one or more of the isolated data flows comprises malware whereby the malware includes the malicious data flow deviations associated with one or more of the isolated data flows. For example, and as previously described at step 306, the malicious data flow detection program 108A, 108B (FIG. 1) may compare the mapped steps of each of the isolated data flows and determine that the isolated data flows 202a, 202b, and 202c are trusted data flows because each shares similar and trusted communications channels and modules whereby information received on the electronic consumer app are transferred through communication channels and modules that are affiliated with or on the electronic consumer app, and that the transferred information is sent via the electronic consumer app to trusted affiliates associated with an purchased item on the app. However, the malicious data flow detection program 108A, 108B (FIG. 1) may determine that the isolated data flow 204 is a malicious data flow deviation, and therefore may be malware, because the isolated data flow 204 extracts and reads user information, such as user credit card information, using modules that may have nothing to do with the electronic consumer app, and may use applications, such as an SMS or email application that may have nothing to do with the electronic consumer app, to send the read user information to an untrusted and unaffiliated third-party.

Then, at 310, in response to the determination that one or more of the isolated data flows comprise malicious data flow deviations, the malicious data flow detection program 108A, 108B (FIG. 1) may determine whether the computer program is malicious by weighing security risks associated with the malicious data flow deviations based on security risk factors. More specifically, the malicious data flow detection program 108A, 108B (FIG. 1) may use security risk factors such as determining a level of sensitivity associated with the information that may be retrieved by the malicious data flow deviation, determining whether there are multiple malicious data flow deviations that may form a clique or set of malicious data flow deviations such that multiple sets of information is maliciously retrieved when using the computing program, and determining a level of linkage between the malicious data flow deviations and the programming code associated with the computing program, whereby the linkage level is based on how much of the programming code associated with the computing program is linked to the malicious data flow deviation. Thereafter, the malicious data flow detection program 108A, 108B (FIG. 1) may weigh each of the security risk factors to determine whether the computing program as a whole is malicious, and therefore malware, or whether just the malicious data flow deviation, while although malicious, may be a small and/or non-threatening deviation in the computing program. For example, the malicious data flow detection program 108A, 108B (FIG. 1) may determine that the isolated data flow 204 is a malicious data flow deviation. Thereafter, the malicious data flow detection program 108A, 108B (FIG. 1) may weigh the security risk factors associated with the isolated data flow 204 that includes the malicious data flow deviation, such as weighing the credit card information that may potentially be sent to an untrusted third-party, and weighing the level of linkage between the malicious data flow deviation and the main programming code for executing transactions on the electronic consumer app. As such, the malicious data flow detection program 108A, 108B (FIG. 1) may determine that because the user's credit card information is highly sensitive data, and because the malicious data flow deviation is linked to transactions executed on the electronic consumer app, the electronic consumer app as a whole is malicious.

Next, at 312, in response to the determination that the computer program is malicious, the malicious data flow detection program 108A, 108B (FIG. 1) may report the computing program as malicious to the user via one or more messaging services and/or applications. Alternatively, in response to the determination that one or more of the isolated data flows associated with a computing program comprises malicious data flow deviations, and that the computer program is not malicious, the malicious data flow detection program 108A, 108B (FIG. 1) may just report to the user the malicious data flow deviations that are associated with the computing program.

It may be appreciated that FIGS. 1-3 provide only illustrations of one implementation and does not imply any limitations with regard to how different embodiments may be implemented. Many modifications to the depicted environments may be made based on design and implementation requirements.

Figure 4:
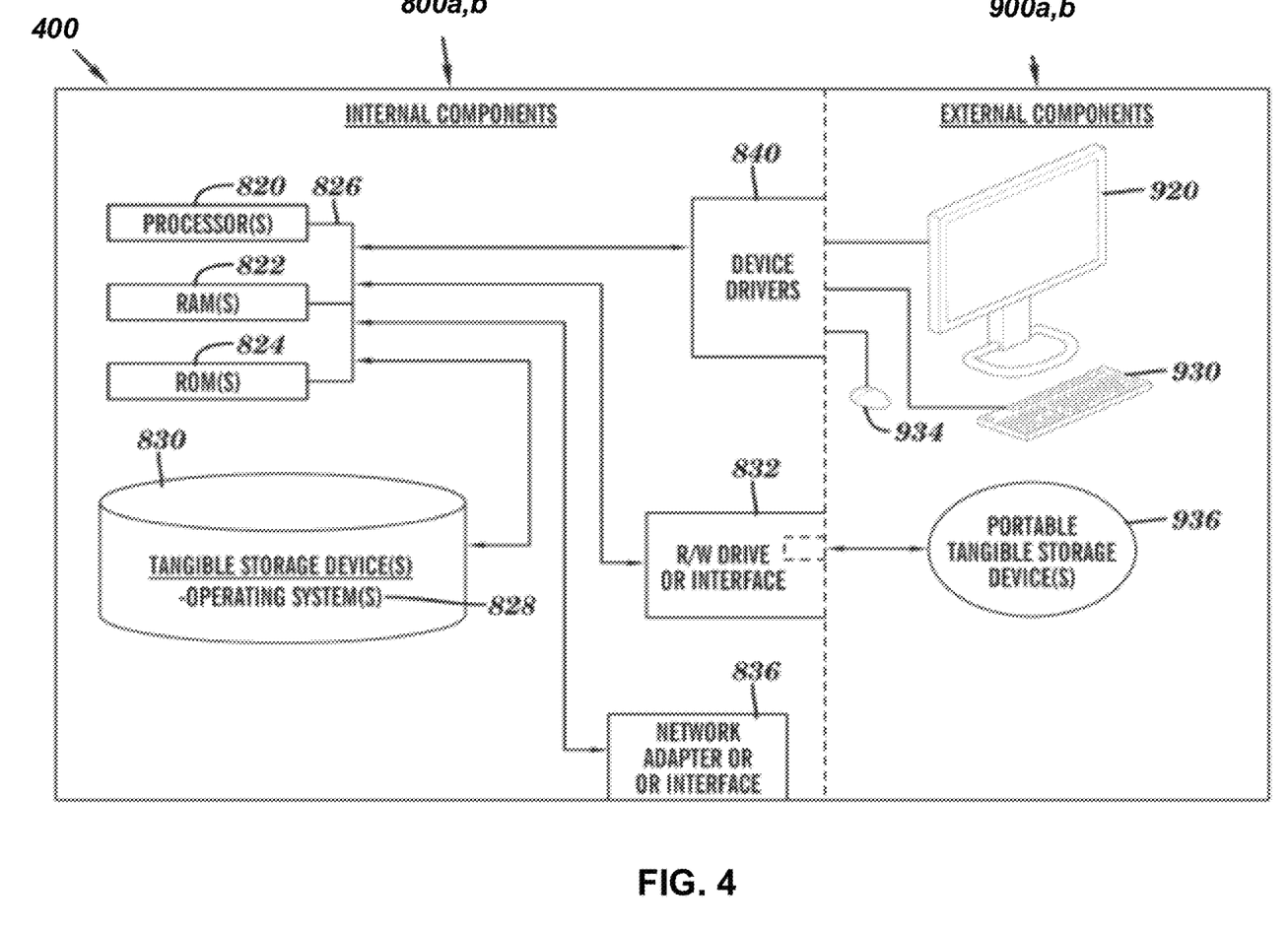
FIG. 4 is a block diagram of the system architecture of a program for detecting malicious code fragments based on data-flow isolation according to one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements. For example, the computer 102 (FIG. 2) associated with an elevator may include an interactive touchscreen (i.e. located on the elevator), and at step 306, the malicious data flow detection program 108A, 108B (FIG. 1) may provide a user interface to the user via the interactive touchscreen to receive the user input via a user typing on the user interface. More specifically, for example, the malicious data flow detection program 108A, 108B (FIG. 1) may receive user input by receiving a user typing via the interactive touchscreen and the user interface, "304" to indicate a room number, and/or "Rooftop," and/or "Weather." Additionally, according to one embodiment, the malicious data flow detection program 108A, 108B (FIG. 1) may provide a list of the amenities associated with a property via the interactive touchscreen and the user interface, whereby the user may select from the list an amenity of interest.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800a, b and external components 900a, b illustrated in FIG. 4. Each of the sets of internal components 800a, b includes one or more processors 820, one or more computer-readable RAMs 822, and one or more computer-readable ROMs 824 on one or more buses 826, and one or more operating systems 828 and one or more computer-readable tangible storage devices 830. The one or more operating systems 828, the software program 114 (FIG. 1) and the malicious data flow detection program 108A (FIG. 1) in client computer 102 (FIG. 1), and the malicious data flow detection program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as a malicious data flow detection program 108A and 108B (FIG. 1), can be stored on one or more of the respective portable computer-readable tangible storage devices 936, read via the respective R/W drive or interface 832, and loaded into the respective hard drive 830.

Each set of internal components 800a, b also includes network adapters or interfaces 836 such as a TCP/IP adapter cards, wireless Wi-Fi interface cards, or 3G or 4G wireless interface cards or other wired or wireless communication links. The malicious data flow detection program 108A (FIG. 1) and software program 114 (FIG. 1) in client computer 102 (FIG. 1), and the malicious data flow detection program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the malicious data flow detection program 108A (FIG. 1) and software program 114 (FIG. 1) in client computer 102 (FIG. 1) and the malicious data flow detection program 108B (FIG. 1) in network server computer 112 (FIG. 1) are loaded into the respective hard drive 830. The network may comprise copper wires, optical fibers, wireless transmission, routers, firewalls, switches, gateway computers, and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930, and computer mouse 934. The device drivers 840, R/W drive or interface 832, and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
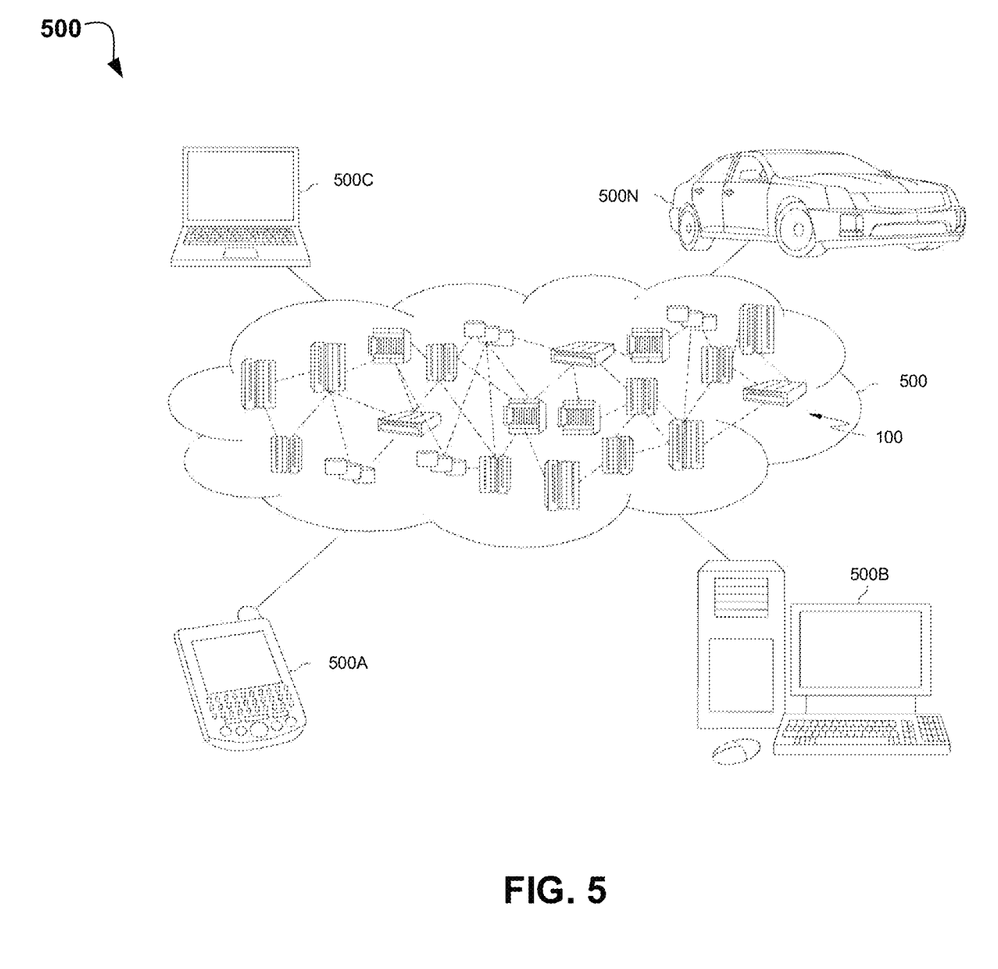
FIG. 5 is a block diagram of an illustrative cloud computing environment including the computer system depicted in FIG. 1, in accordance with an embodiment of the present disclosure.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
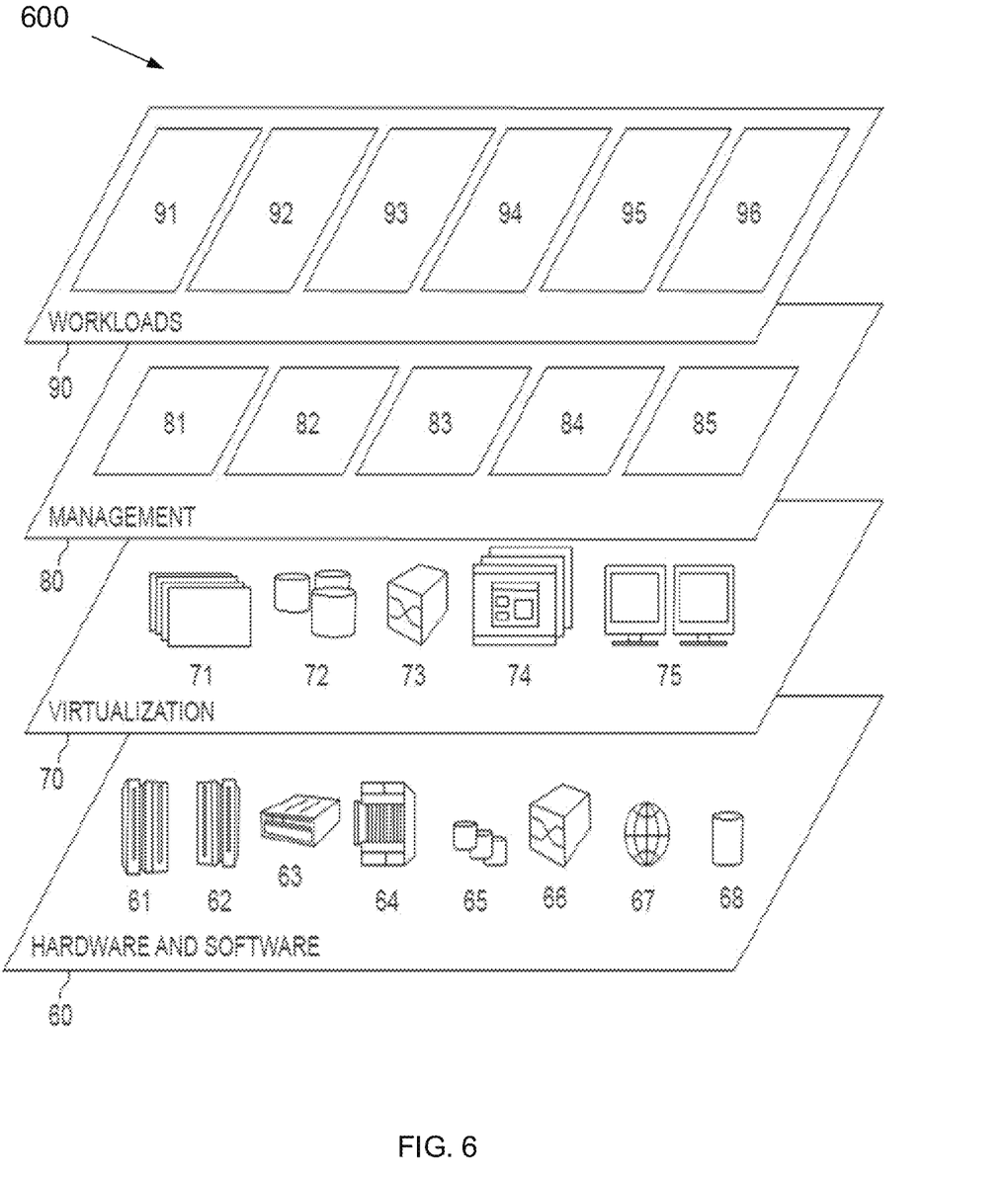
FIG. 6 is a block diagram of functional layers of the illustrative cloud computing environment of FIG. 5, in accordance with an embodiment of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and malicious data flow detection 96. A malicious data flow detection program 108A, 108B (FIG. 1) may be offered "as a service in the cloud" (i.e., Software as a Service (SaaS)) for applications running on mobile devices 102 (FIG. 1) and may detect malicious code fragments based on data-flow isolation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting malicious code fragments based on data-flow isolation, the method comprising:

isolating a plurality of data flows associated with a computing program for a user device, wherein the isolating the plurality of data flows further comprising dividing program code extracted from the computing program into code fragments depicting different flows of information associated with different uses of the computing program;

mapping one or more steps associated with the plurality of isolated data flows to one or more modules associated with the computing program and the user device;

comparing the one or more mapped steps associated with the plurality of isolated data flows to determine connections and commonalities between the plurality of isolated data flows, wherein the comparing the one or more mapped steps further comprising identifying one or more trusted data flows of the plurality of isolated data flows that include information depicting user information being sent using first modules on the computing program to a trusted affiliate of the computing program;

based on the comparison of the one or more mapped steps associated with the plurality of isolated data flows and based on the one or more modules associated with the computing program and the user device, determining that one or more isolated data flows of the plurality of isolated data flows comprise malicious data flow deviations, wherein the determining that the one or more isolated data flows comprise the malicious data flow deviations further comprising determining the one or more isolated data flows include information depicting the user information being read using second modules unaffiliated with the computing program and sent to an untrusted third-party;

in response to the determination that the one or more isolated data flows comprise the malicious data flow deviations, determining, based on a plurality of security risk factors, whether the malicious data flow deviations render the computing program as a whole malicious versus whether the malicious data flow deviations include a deviation that is malicious yet non-threatening to the computing program and thus render the computing program as a whole not malicious; and in response to the determination that the malicious data flow deviations render the computing program as a whole not malicious, reporting the malicious data flow deviations to a user of the user device.

2. The method of claim 1, wherein the one or more modules comprises one or more storage units on a data storage device and one or more processing units on one or more processors.

3. The method of claim 1, wherein comparing the one or more mapped steps associated with the plurality of isolated data flows further comprises:

comparing a flow of information associated with the plurality of isolated data flows; and comparing the one or more modules associated with the plurality of isolated data flows.

4. The method of claim 1, wherein the plurality of security risk factors are selected from a group comprising at least one of a level of sensitivity associated with information based on the malicious data flow deviations, a determination that the computing program comprises a malicious data flow deviations set, and a level of linkage between the malicious data flow deviations and programming code associated with the computing program.

5. The method of claim 1, further comprising:

in response to the determination that the malicious data flow deviations render the computing program as a whole malicious, reporting the computing program as malicious to the user via one or more messaging applications.

6. The method of claim 1, further comprising:

in response to the determination that the malicious data flow deviations render the computing program as a whole not malicious, reporting the malicious data flow deviations to the user via one or more messaging applications.

7. A computer system for detecting malicious code fragments based on data-flow isolation, comprising:

one or more processors, one or more computer-readable memories, one or more computer-readable tangible storage devices, and program instructions stored on at least one of the one or more computer-readable tangible storage devices for execution by at least one of the one or more processors via at least one of the one or more computer-readable memories, wherein the computer system is configured to perform operations comprising:

isolating a plurality of data flows associated with a computing program for a user device, wherein the isolating the plurality of data flows further comprising dividing program code extracted from the computing program into code fragments depicting different flows of information associated with different uses of the computing program;

mapping one or more steps associated with the plurality of isolated data flows to one or more modules associated with the computing program and the user device;

comparing the one or more mapped steps associated with the plurality of isolated data flows to determine connections and commonalities between the plurality of isolated data flows, wherein the comparing the one or more mapped steps further comprising identifying one or more trusted data flows of the plurality of isolated data flows that include information depicting user information being sent using first modules on the computing program to a trusted affiliate of the computing program;

based on the comparison of the one or more mapped steps associated with the plurality of isolated data flows and based on the one or more modules associated with the computing program and the user device, determining that one or more isolated data flows of the plurality of isolated data flows comprise malicious data flow deviations, wherein the determining that the one or more isolated data flows comprise the malicious data flow deviations further comprising determining the one or more isolated data flows include information depicting the user information being read using second modules unaffiliated with the computing program and sent to an untrusted third-party;

in response to the determination that the one or more isolated data flows comprise the malicious data flow deviations, determining, based on a plurality of security risk factors, whether the malicious data flow deviations render the computing program as a whole malicious versus whether the malicious data flow deviations include a deviation that is malicious yet non-threatening to the computing program and thus render the computing program as a whole not malicious; and in response to the determination that the malicious data flow deviations render the computing program as a whole not malicious, reporting the malicious data flow deviations to a user of the user device.

8. The computer system of claim 7, wherein the one or more modules comprises one or more storage units on the one or more computer-readable tangible storage devices and one or more processing units on the one or more processors.

9. The computer system of claim 7, wherein comparing the one or more mapped steps associated with the plurality of isolated data flows further comprises:

comparing a flow of information associated with the plurality of isolated data flows; and comparing the one or more modules associated with the plurality of isolated data flows.

10. The computer system of claim 7, wherein the plurality of security risk factors are selected from a group comprising at least one of a level of sensitivity associated with information based on the malicious data flow deviations, a determination that the computing program comprises a malicious data flow deviations set, and a level of linkage between the malicious data flow deviations and programming code associated with the computing program.

11. The computer system of claim 7, further comprising:

in response to the determination that the malicious data flow deviations render the computing program as a whole malicious, reporting the computing program as malicious to the user via one or more messaging applications.

12. The computer system of claim 7, further comprising:

in response to the determination that the malicious data flow deviations render the computing program as a whole not malicious, reporting the malicious data flow deviations to the user via one or more messaging applications.

13. A computer program product for detecting malicious code fragments based on data-flow isolation, comprising:

one or more computer-readable storage devices and program instructions stored on at least one of the one or more computer-readable storage devices, the program instructions when executed by a processor cause the processor to perform operations comprising:

isolating a plurality of data flows associated with a computing program for a user device, wherein the isolating the plurality of data flows further comprising dividing program code extracted from the computing program into code fragments depicting different flows of information associated with different uses of the computing program;

mapping one or more steps associated with the plurality of isolated data flows to one or more modules associated with the computing program and the user device;

comparing the one or more mapped steps associated with the plurality of isolated data flows to determine connections and commonalities between the plurality of isolated data flows, wherein the comparing the one or more mapped steps further comprising identifying one or more trusted data flows of the plurality of isolated data flows that include information depicting user information being sent using first modules on the computing program to a trusted affiliate of the computing program;

based on the comparison of the one or more mapped steps associated with the plurality of isolated data flows and based on the one or more modules associated with the computing program and the user device, determining that one or more isolated data flows of the plurality of isolated data flows comprise malicious data flow deviations, wherein the determining that the one or more isolated data flows comprise the malicious data flow deviations further comprising determining the one or more isolated data flows include information depicting the user information being read using second modules unaffiliated with the computing program and sent to an untrusted third-party;

in response to the determination that the one or more isolated data flows comprise the malicious data flow deviations, determining, based on a plurality of security risk factors, whether the malicious data flow deviations render the computing program as a whole malicious versus whether the malicious data flow deviations include a deviation that is malicious yet non-threatening to the computing program and thus render the computing program as a whole not malicious; and in response to the determination that the malicious data flow deviations render the computing program as a whole not malicious, reporting the malicious data flow deviations to a user of the user device.

14. The computer program product of claim 13, wherein the one or more modules comprises one or more storage units on a data storage device and one or more processing units on one or more processors.

15. The computer program product of claim 13, wherein comparing the one or more mapped steps associated with the plurality of isolated data flows further comprises:
comparing a flow of information associated with the plurality of isolated data flows; and
comparing the one or more modules associated with the plurality isolated data flows.

16. The computer program product of claim 13, wherein the plurality of security risk factors are selected from a group comprising at least one of a level of sensitivity associated with information based on the malicious data flow deviations, a determination that the computing program comprises a malicious data flow deviations set, and a level of linkage between the malicious data flow deviations and programming code associated with the computing program.

17. The computer program product of claim 13, further comprising:
in response to the determination that the malicious data flow deviations render the computing program as a whole malicious, reporting the computing program as malicious to the user via one or more messaging applications.

* * * * *